F. STRIDDE.
Plows.
No. 157,887. Patented Dec. 15, 1874.
FIG I
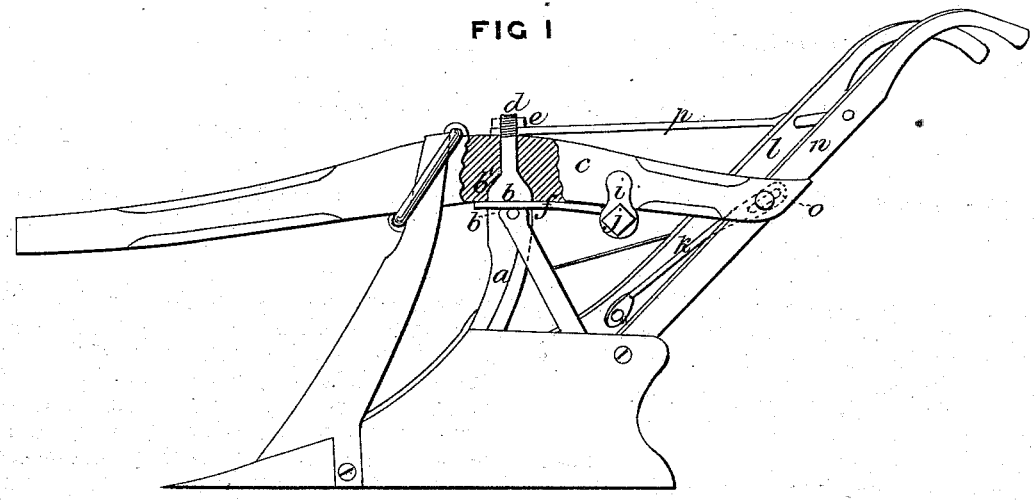
FIG II
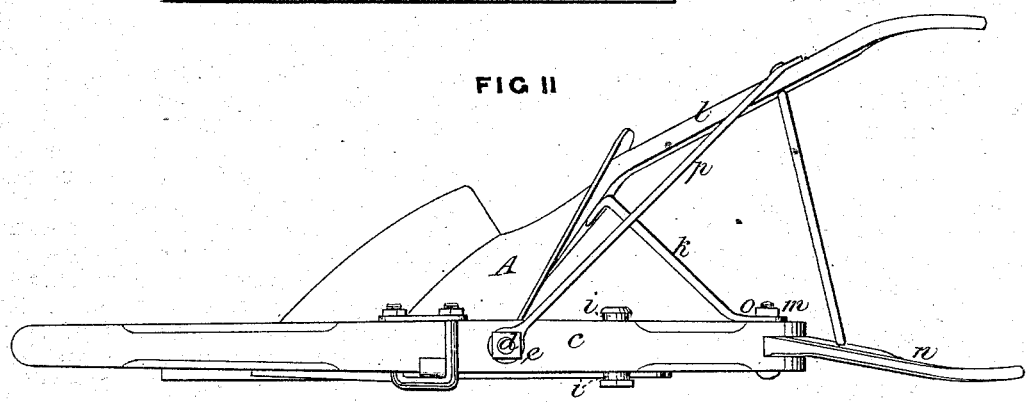
FIG III
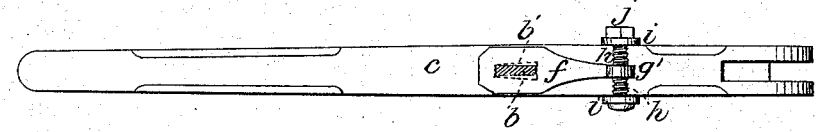
FIG IV
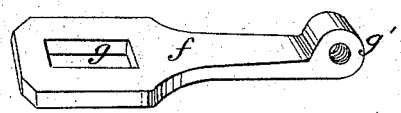
WITNESSES
John E Laing
J H Rutherford
INVENTOR
Fred. Stridde,
by Johnson and Johnson
his Attorneys

UNITED STATES PATENT OFFICE.

FRIEDERICH STRIDDE, OF MENASHA, WISCONSIN.

IMPROVEMENT IN PLOWS.

Specification forming part of Letters Patent No. 157,887, dated December 15, 1874; application filed April 17, 1874.

*To all whom it may concern:*

Be it known that I, FRIEDERICH STRIDDE, of Menasha, in the county of Winnebago and State of Wisconsin, have invented a new and useful Improvement in Plows, of which the following is a specification:

My invention relates to devices for adjusting plows into and from land without changing the center of draft; and the special features of my invention consist in the combination, with the plow-standard and the beam, of a plate having a slot in one end, fitted over and upon the angular shank of a plow-standard, and a horizontal adjusting-screw, connected by arms with and crossing beneath the beam, and passing through a screw-threaded eye in the free end of said plate, so that the turning of said screw to the right or left will thereby turn the plow-standard upon its angular shank, the opening in the plow-beam being sufficiently large to admit of such movement, and thereby adjust the plow-point into and from the land, the screw, by its fixed connection with the beam-arms, serving to make the adjustment positive and the means for holding the set when made, producing a strong, effective, and simple device for making the required adjustment at once, and without the necessity of having to unclamp said adjusting-screw before the adjustment can be made. My improvement also consists in the combination, with the plow-standard, the beam, and the adjusting-plate and screw connected therewith, of a brace-arm extending obliquely from the mold-board handle, and connecting, by a slotted end and clamp-screw, to the land-side handle, whereby the threads of the adjusting-screw are relieved from the lateral resistance of the plow, and the adjustment of the latter, through the adjusting device, made by unclamping the oblique brace-arm, to give sufficient freedom by its slotted end for the handles to open in turning the plow to the left and to close in turning it to the right, the free end of the brace-arm, when unclamped, sliding up and down for this purpose, through the yielding or giving of the mold-board handle, as the plow is turned upon its shank.

In the accompanying drawings, Figure 1 represents an elevation of the land-side of a plow embracing my invention, the beam being shown in section at its junction with the mold-board standard; Fig. 2, a top view of the same; Fig. 3, a view of the under side of the beam with the adjusting device, and Fig. 4 the slotted and eyed plate of the adjusting device.

The plow-standard $a$ has an oblong square shank, $b$, which enters, for a short distance, an opening, $b'$, in the beam $c$, and has a screw-standard stem, $d$, passing through the beam, and secured, by a nut, $e$, on top. An iron plate, $f$, has an oblong slot, $g$, in one end, to fit over and upon its oblong square shank $b$ of the standard, and so as to lie close to the under side of the beam. This end of the plate rests upon the upper end of an oblique brace as a shoulder, secured to the upper end of the standard and connecting with the land-side. The other end of the plate $f$ has an eye, $g'$, in which is a female screw-thread, and through which passes a screw-stem, $h$, which is fitted within the ends of short arms $i$, secured to each side of the beam $c$, so as to secure the screw-stem $h$ in a cross position just beneath the beam, and allow said screw to be turned either to the right or left, bringing the plow-point in or out of the line of draft, to take more or less land, without changing the center of draft, the beam being fixed, and the plate deriving its adjusting capacity therefrom by simply turning the screw-stem in its holding-arms. One end of the screw $h$ is provided with a square head, $j$, for a wrench, and the other end has a head, so that the eyed end of the plate must move over the screw-stem when the latter is turned by the wrench. To allow of this movement of the standard-shank the opening $b'$ in the beam is made of greater width than the shank, as shown in dotted lines in Fig. 3. To relieve the threads of the adjusting-screw stem of the strain of the plow in working, a brace-arm, $k$, is fixed to the inner side of the mold-board handle $l$, and, extending obliquely upward, is connected, by a clamp-bolt and nut, $m$, to the inner side of the land-side handle $n$, and thereby braces the mold-board A, beam $c$, and handles. In adjusting the plow for more or less land, however, this brace $k$ must be unclamped by the nut $m$, and, having its end $o$ slotted, as shown by dotted lines in Fig. 1, it will rise and fall over the clamp-bolt as the plow is turned upon its standard. In this operation the handles will yield or bend, so as to open slightly in giving the plow more land and close in giving less land, the oblique brace $k$, by its slotted end $o$, moving down and up accordingly. When the adjustment is made the brace $k$ is again clamped fast. A brace, $p$, extends from the standard-stem $d$ obliquely to the mold-board handle, which brace will yield in and out with said handle.

A few revolutions of the screw-stem will be sufficient to turn the plow-point, and to adjust it, as may be desired, to give the furrow more or less width, according to the character of the soil. The plate $f$ is put upon the standard before the beam is secured in place, and the screw-stem is secured in holding-arms $i$ after being passed through the screw-eye $g'$ of the plate.

The device may be applied to any plow.

Various adjusting devices have been used for giving more or less land; and I do not claim making such adjustment irrespective of the construction and means which form the subject-matter of this patent.

I claim—

1. The combination, with the angular plow-standard $b$ and the beam $c$, of a slotted plate, $f$, embracing said standard, and a horizontal adjusting-screw stem, $h$, secured to said beam by arms $i$, and passing across through a screw-threaded eye, $g'$, in said plate, substantially as described, for the purpose of adjusting the plow to give more or less land thereto.

2. The combination, with the plow-standard, the beam, and the adjusting device, of the oblique brace-arm $k$, provided with the slotted end $o$, and the clamp-screw bolt and nut $m$, for connecting the handles, substantially as herein set forth, whereby the beam, handles, and plow are braced to relieve the adjusting-screw stem of the lateral strain of the plow.

FREDERICH STRIDDE.

Witnesses:
GUSTAV SCHLEGEL,
JULIUS TIEMEYER.